United States Patent
Hartmann et al.

(10) Patent No.: US 8,317,642 B2
(45) Date of Patent: Nov. 27, 2012

(54) DEVICE FOR DRIVING A GENERATOR BY A BELT DRIVE OF AN INTERNAL COMBUSTION ENGINE

(75) Inventors: Bernd Hartmann, Weisendorf (DE); Christian Hauck, Altdorf (DE); Andrea Reichert, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 298 days.

(21) Appl. No.: 12/637,006

(22) Filed: Dec. 14, 2009

(65) Prior Publication Data

US 2010/0167856 A1 Jul. 1, 2010

(30) Foreign Application Priority Data

Dec. 13, 2008 (DE) .......... 10 2008 062 173

(51) Int. Cl.
*F16D 3/00* (2006.01)
*F16D 1/12* (2006.01)
*F16D 3/10* (2006.01)
*F16H 55/14* (2006.01)
*F16H 55/36* (2006.01)
*F16F 15/121* (2006.01)

(52) U.S. Cl. .......... 474/94; 464/66.1; 464/67.1; 464/82; 464/160

(58) Field of Classification Search .................... 474/94; 464/66.1, 67.1, 82, 160
See application file for complete search history.

(56) References Cited

U.S. PATENT DOCUMENTS

| | | | | |
|---|---|---|---|---|
| 306,267 A | * | 10/1884 | Turno | .......... 464/67.1 |
| 447,447 A | * | 3/1891 | Daily | .......... 476/1 |
| 608,770 A | * | 8/1898 | Godfray | .......... 464/67.1 |
| 746,583 A | * | 12/1903 | Saxon | .......... 464/67.1 |
| 1,254,542 A | * | 1/1918 | Schwinn | .......... 464/67.1 |
| 3,081,856 A | * | 3/1963 | Wolfram et al. | .......... 192/104 R |
| 3,119,480 A | * | 1/1964 | Fuchs | .......... 192/44 |
| 5,377,796 A | * | 1/1995 | Friedmann et al. | .......... 192/3.29 |
| 6,161,512 A | * | 12/2000 | Beels Van Heemstede | .......... 123/90.31 |
| 6,354,413 B2 | * | 3/2002 | Heller et al. | .......... 192/3.29 |
| 2007/0037644 A1 | * | 2/2007 | Mevissen et al. | .......... 474/70 |

FOREIGN PATENT DOCUMENTS

DE 102006057793 6/2008

\* cited by examiner

*Primary Examiner* — William E Dondero
*Assistant Examiner* — Henry Liu
(74) *Attorney, Agent, or Firm* — Volpe and Koenig, P.C.

(57) ABSTRACT

A device for connecting a generator to a belt drive of an internal combustion engine is provided, which includes a belt pulley (1) that is guided so that it can rotate relative to a hub (2) set on a shaft (3). At least one spring element is arranged between the belt pulley (1) and the hub (2) and connects the belt pulley (1) and the hub (2) to each other elastically for transferring rotational motion and here sets a relative rotation between the belt pulley (1) and the hub (2) corresponding to an effective torsional stiffness. The at least one spring element is placed with a defined movement play (s) with respect to the belt pulley (1) and/or the hub (2), in order to allow relative rotation through the movement play (s) in a first region (I) with a low torsional stiffness, while, in a second region (2), a high torsional stiffness can be generated by the at least one spring element.

6 Claims, 2 Drawing Sheets

DEVICE FOR DRIVING A GENERATOR BY A BELT DRIVE OF AN INTERNAL COMBUSTION ENGINE

CROSS-REFERENCE TO RELATED APPLCIATIONS

This application claims the benefit of German Patent application DE 10 2008 062 173.0, filed Dec. 13, 2008, which is incorporated herein by reference as if fully set forth.

BACKGROUND

The invention relates to a device for connecting a generator (or alternator) to a belt drive of an internal combustion engine, comprising a belt pulley that is guided so that it can rotate relative to a hub set on a shaft, wherein at least one spring element arranged between the belt pulley and hub connects the belt pulley and the hub to each other elastically for transferring rotational motion and in this way sets a relative rotation between the belt pulley and hub according to an effective torsional stiffness.

For powering the on-board power network of a motor vehicle, a generator is typically provided in the area of the internal combustion engine, wherein this generator is connected via a belt drive to a crankshaft of the internal combustion engine and is set in rotation by the engine when the internal combustion engine is running. This rotation generates the current required for operating the electrical load and for charging the starter battery.

The characteristic rotational irregularities of the internal combustion engine, however, lead to the introduction of forces and resonances into the belt drive, which would lead, in the case of a rigid connection to the secondary assemblies, to strong oscillations in its drive. In order to reduce this effect, devices are typically provided between the belt drive and the corresponding assembly, in order to achieve decoupling from the crankshaft of the internal combustion engine.

From DE 10 2006 057 793 A1, a device of this type is known for connecting a secondary assembly, such as, for example, a generator, to a crankshaft by means of a belt drive. This device comprises a belt pulley that is guided so that it can rotate by a bearing relative to a hub that is placed on a shaft of the secondary assembly. In order to allow a transfer of the rotational motion of the belt drive from the belt pulley to the hub and to simultaneously equalize the rotational irregularities of the internal combustion engine introduced into the belt drive, between the belt pulley and the hub there are three spring elements that connect the belt pulley and the hub to each other elastically and that allow a relative rotation between both elements according to an effective torsional stiffness.

A disadvantage in a device of the state of the art is that, through the arrangement of the spring elements between the belt pulley and hub, only one, constant torsional stiffness is defined. However, in the case of belt-driven generators, it is desirable to use a device with the smallest possible torsional stiffness in the case of a small load on the generator, in order to decouple the generator to a large extent from the belt drive. In the case of a large load on the generator due to a higher current draw, a small torsional stiffness generates a very wide relative rotation between the belt pulley and the hub due to the counter moment generated by the current draw in the generator. In order to prevent this, in turn, and in order to keep the operating range of the device small, a high torsional stiffness is consequently desired for a high load on the generator. Typically, therefore, in the case of a device of the state of the art for connecting a generator to the belt drive of an internal combustion engine, a compromise solution is reached between a small torsional stiffness and a higher torsional stiffness.

SUMMARY

The objective of the present invention is therefore to make available such a device in which, in the case of a small generator load, a small torsional stiffness and, in the case of a corresponding high load on the generator, a sufficiently high torsional stiffness can be presented.

This objective is met by a device according to the invention. Additional features advantageous refinements of the invention are discussed below and in the claims.

The invention is based on the technical teaching that the one or more spring elements arranged between the belt pulley and the hub are placed with a defined movement play with respect to the belt pulley and/or the hub. This is allowed through the movement play in a first region of a relative rotation between the belt pulley and the hub with a small, effective torsional stiffness, while in a second region a high torsional stiffness can be generated by the one or more spring elements. Through the use of the movement play of the one or more spring elements, a small resultant torsional stiffness can thus be generated in a simple way in the first region. In contrast, in the second region, through the completely effective torsional stiffness of the one or more spring elements, in the case of a large generator load, a very large rotation between the belt pulley and the hub is prevented. Accordingly, by defining the movement play, the first and the second torsional-stiffness regions can be constructed accordingly and a compromise solution can be eliminated. In addition, through the movement play, a simpler assembly of the one or more spring element is possible, because this is no longer required to be done with biasing. Another advantage is also that such a construction of the device can reduce its natural resonance rotational speed, which also leads to a reduction of the oscillation dynamics of the system when running at this rotational speed.

Corresponding to one embodiment of the invention, the first and second torsional-stiffness regions are each provided symmetric in both rotational directions from a center position. This has the advantage that initially a low torsional stiffness acts in both rotational directions between the belt pulley and hub and thus good decoupling can be achieved, while too strong a relative rotation and constant wandering into the mechanical end stops is prevented by the subsequent high torsional stiffness.

In one refinement of the invention, a relative rotation from the center position is possible in only one rotational direction. Advantageously, the device according to the invention could also be used in a starter-generator application. When started by the starter generator, the torque is transmitted from the hub to the belt pulley directly via the mechanical end stop. In this case, initially a movement play must be bridged, which would otherwise lead to high kinetic energy in the shaft of the starter generator and finally to a hard impact on the mechanical end stop.

According to an advantageous refinement of the invention, the one or more spring elements are constructed in the form of at least one bow spring that is placed in channels between the belt pulley and the hub. By using a bow spring, an elastic connection of the belt pulley to the hub can be constructed in a compact way.

In another refinement of the invention, the channels provided between the belt pulley and the hub for holding the one or more bow springs are divided in the radial direction. This has the advantage that the device can be constructed more compactly in the axial direction.

BRIEF DESCRIPTION OF THE DRAWINGS

Additional measures improving the invention are shown in more detail below with reference to the figures together with the description of preferred embodiments of the invention.
Shown are.

DETAILED DESCRIPTION OF THE PREFERRED EMBODIMENTS

Figure 1:
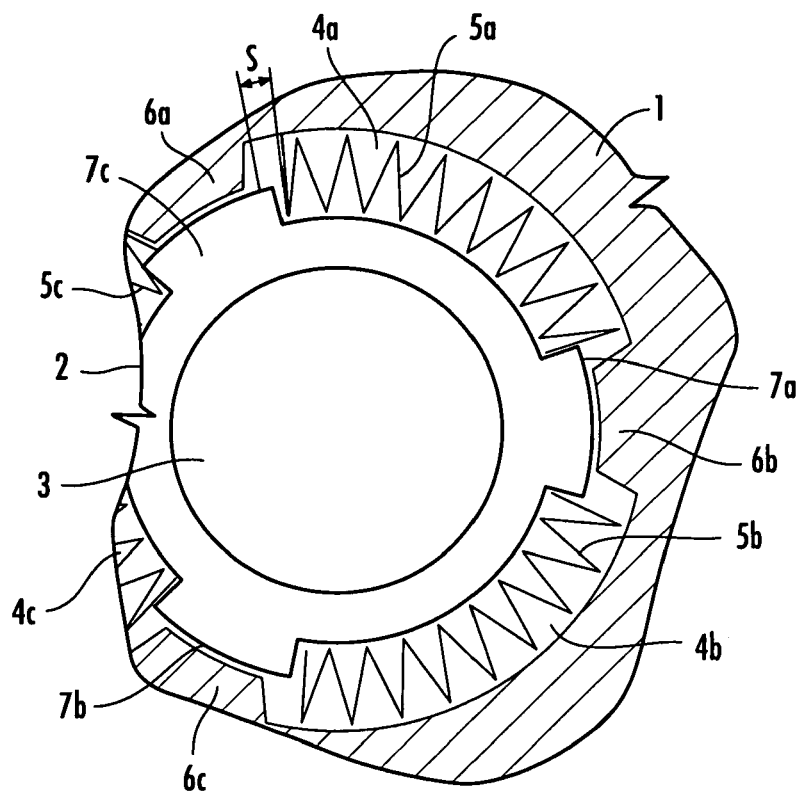
FIG. 1 is a schematic section view of the device according to the invention in the region between a belt pulley and a hub.
Figure 2:
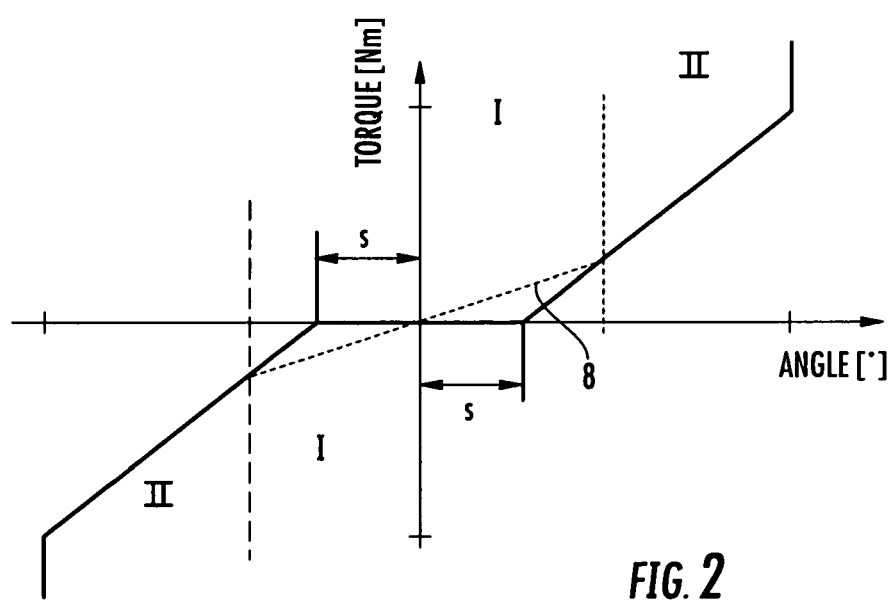
FIG. 2 is a diagram that maps the torsional-stiffness characteristic line of the device shown in FIG. 1.

In FIG. 1, a schematic section view of the device according to the invention for connecting a generator or alternator to a belt drive of an internal combustion engine is shown. In this device, a belt pulley 1 is guided so that it can rotate relative to a hub 2 that is set on a shaft 3 of the generator. The belt pulley 1 is here constructed in a way known to someone skilled in the art and connects to the crankshaft of the internal combustion engine by a belt not shown here. When the internal combustion engine is running, the belt pulley 1 is set in rotation by the belt drive and the rotational motion is transferred indirectly to the hub 2, wherein the generator is driven by the shaft 3. To make possible the transfer of rotational motion of the belt pulley 1 to the hub 2 and simultaneously to prevent the introduction of rotational irregularities into the drive of the generator, bow springs 5a-5c are placed between the belt pulley 1 and hub 2 and in channels 4a-4c defined by two components and divided in the radial direction. Here, it is clear to someone skilled in the art that the channels 4a-4c could also be constructed divided just as well in the axial direction. Through the use of the bow springs 5a-5c, the belt pulley 1 transfers the rotational motion introduced by the belt drive to radial projections 7a-7c of the hub 2 via radial projections 6a-6c. Here, however, the radial extensions 7a-7c of the hub 2 are constructed larger in the peripheral direction than the radial extensions 6a-6c of the belt pulley 1, so that a movement play s is realized between the belt pulley 1 and the bow springs 5a-5c. It is clear to someone skilled in the art, however, that the radial extensions 6a-6c of the belt pulley 1 could also be constructed larger or, as a whole, the movement play s could be provided between the radial extensions 6a-6c and 7a-7c and the bow springs 5a-5c. This movement play s provides for movement from the middle position of the device shown in FIG. 1 such that initially no contact of the belt pulley 1 takes place in the case of rotational motion with the bow springs 5a-5c. Therefore, the hub 2 is completely decoupled from the belt pulley 1 within this clearance space, which leads to a torsional stiffness shown in FIG. 2 in a diagram. In this diagram in which the torque transmitted by the device is shown by a relative rotational angle between the belt pulley 1 and hub 2, it is to be recognized that, in a first region I, due to the movement play s, a lower, resultant torsional stiffness, shown by the dashed line 8, is achieved than in a second region II. This has the result that, in the first region I, better decoupling of the hub 2 from the belt pulley 1 and thus of the generator from the crankshaft of the internal combustion engine is achieved. For very large relative rotations between the belt pulley 1 and hub 2 that could be produced by high current draws on the generator, the higher torsional stiffness of the second region II is effective, wherein the operating range of the device can be kept small.

Figure 3:
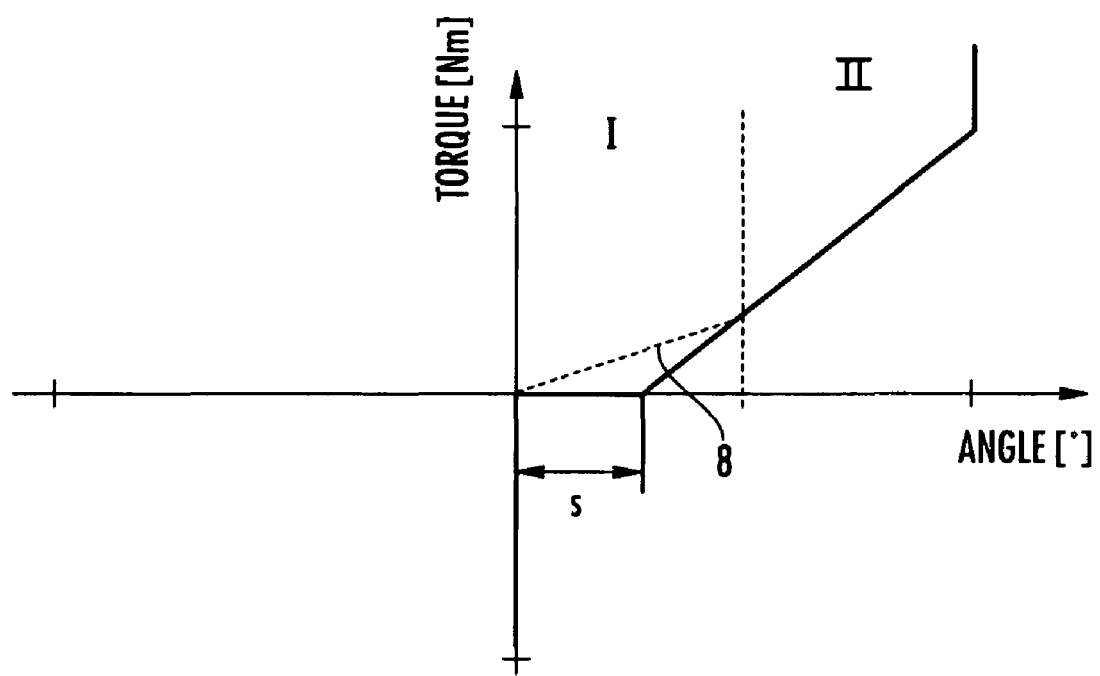
FIG. 3 is a diagram that shows the torsional-stiffness characteristic line of another possible construction of the device according to the invention.

In FIG. 3, in another diagram, a torsional stiffness of another possible construction of the device is shown. In contrast to the torsional stiffness shown in FIG. 2, this is not constructed symmetric in both rotational directions from a center position between the belt pulley and the hub 2, but instead has the two regions I and II in only one rotational direction, while in the other rotational direction, the torsional stiffness is almost infinitely large due to a direct mechanical contact between the belt pulley 1 and hub 2. Through the use of such a design of the torsional stiffness, it is possible to use the device according to the invention also for a starter generator. Here, in the rotational direction in which, when the internal combustion engine is started, torque is transferred from the hub 2 to the belt pulley 1, driving can be performed through the direct mechanical contact without passing through a movement play, while, in the other rotational direction, the generator could be decoupled in the already described way in the case of a running internal combustion engine.

Overall, through the device according to the invention it is possible to better decouple the generator from the crankshaft of the internal combustion engine and simultaneously to keep the operating range of the device small.

LIST OF REFERENCE SYMBOLS

1 Belt pulley
2 Hub
3 Shaft
4a-4c Channels
5a-5c Bow springs
6a-6c Radial extensions of the belt pulley
7a-7c Radial extensions of the hub
8 Resultant torsional stiffness
s Movement play
I First torsional-stiffness region
II Second torsional-stiffness region

The invention claimed is:
1. Device for connecting a generator to a belt drive of an internal combustion engine, comprising a belt pulley that is guided so that it can rotate relative to a hub set on a shaft, at least one spring element arranged between the belt pulley and the hub connects the belt pulley and the hub to each other elastically for transferring rotational motion via contact of outwardly directed radial extensions on the hub and inwardly directed radial extensions on the belt pulley with the at least one spring element, wherein the outwardly directed radial extensions on the hub do not overlap in a radial direction with and are larger in a peripheral direction than the inwardly directed radial extensions on the belt pulley, and the at least one spring element sets a relative rotation between the belt pulley and hub corresponding to an effective torsional stiffness, the at least one spring element is placed with a defined movement play with respect to at least one of the belt pulley or the hub, in order to allow relative rotation through the defined movement play in a first region with a low, effective torsional stiffness, while, in a second region, a high torsional stiffness is generated by the at least one spring element.
2. Device according to claim 1, wherein the first and the second torsional-stiffness regions are provided symmetric in both rotational directions from a center position.

3. Device according to claim 1, wherein a relative rotation from a center position is possible in only one rotational direction.

4. Device according to claim 1, wherein the at least one spring element comprises at least one bow spring that is placed in channels located between the belt pulley and the hub.

5. Device according to claim 4, wherein the channels provided between the belt pulley and the hub are divided in a radial direction.

6. Internal combustion engine comprising a belt drive for operating a generator, the belt drive including a belt pulley that is guided so that it can rotate relative to a hub set on a shaft, at least one spring element arranged between the belt pulley and the hub connects the belt pulley and the hub to each other elastically for transferring rotational motion via contact of outwardly directed radial extensions on the hub and inwardly directed radial extensions on the belt pulley with the at least one spring element, wherein the outwardly directed radial extensions on the hub do not overlap in a radial direction with and are larger in a peripheral direction than the inwardly directed radial extensions on the belt pulley, and the at least one spring element sets a relative rotation between the belt pulley and hub corresponding to an effective torsional stiffness, the at least one spring element is placed with a defined movement play with respect to at least one of the belt pulley or the hub, in order to allow relative rotation through the defined movement play in a first region with a low, effective torsional stiffness, while, in a second region, a high torsional stiffness is generated by the at least one spring element.

* * * * *